No. 666,167. Patented Jan. 15, 1901.
J. WAGNER.
BOLT MAKING AND FORGING MACHINE.
(Application filed Apr. 21, 1900.)
(No Model.) 4 Sheets—Sheet 1.

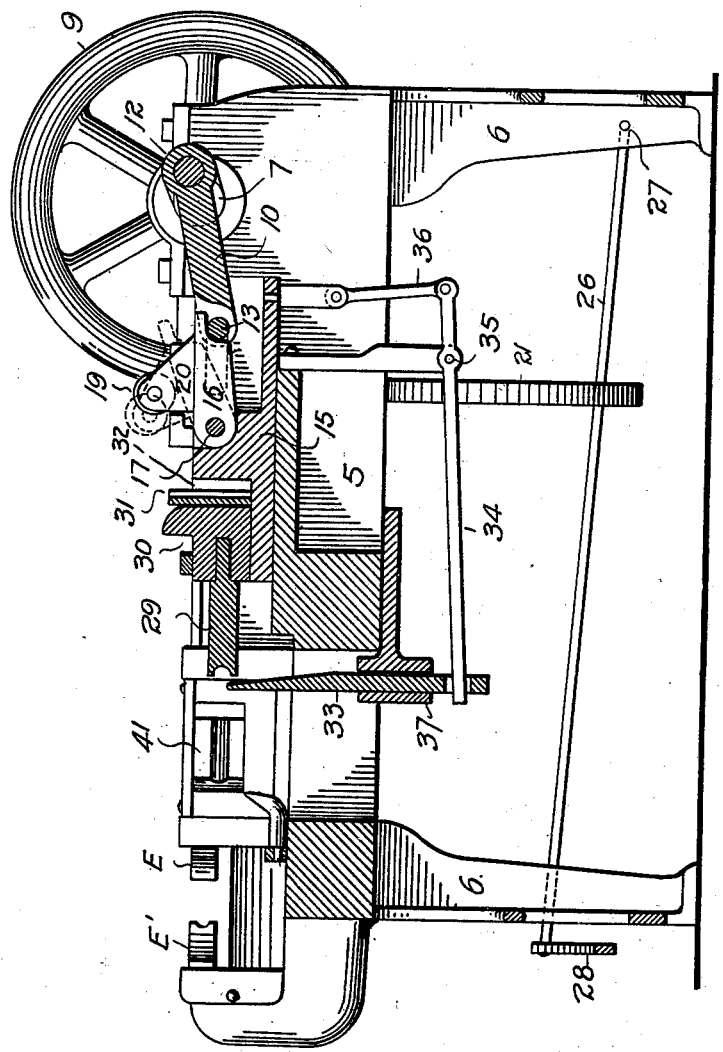

No. 666,167. Patented Jan. 15, 1901.
J. WAGNER.
BOLT MAKING AND FORGING MACHINE.
(Application filed Apr. 21, 1900.)
(No Model.) 4 Sheets—Sheet 3.

WITNESSES:

INVENTOR.
John Wagner.
BY
ATTORNEY.

No. 666,167. Patented Jan. 15, 1901.
J. WAGNER.
BOLT MAKING AND FORGING MACHINE.
(Application filed Apr. 21, 1900.)
(No Model.) 4 Sheets—Sheet 4.
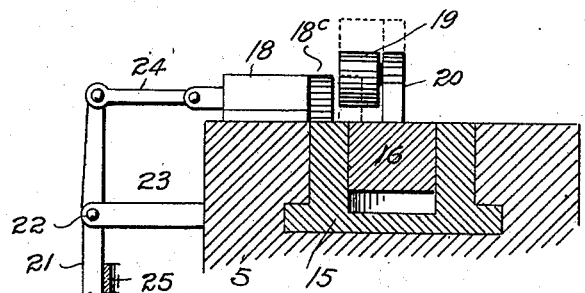
FIG. 5
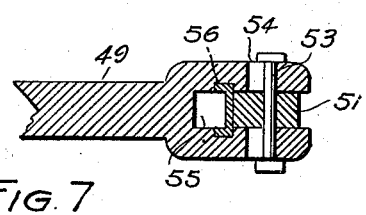
FIG. 7
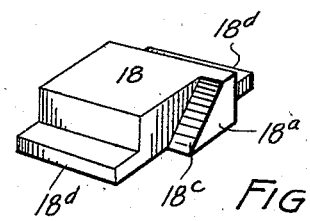
FIG. 6
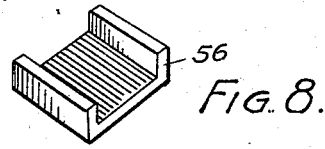
FIG. 8
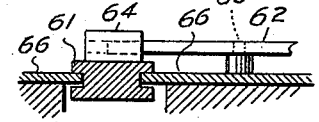
FIG. 9
FIG. 10
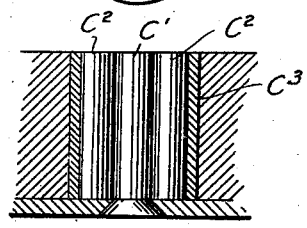
FIG. 12
FIG. 13
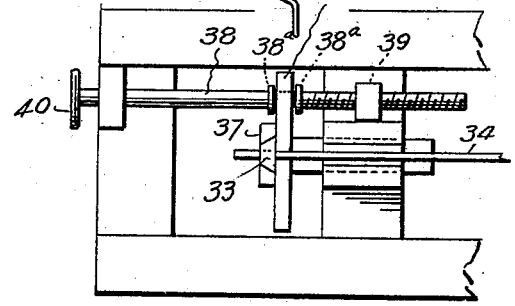
FIG. 11
WITNESSES: INVENTOR.
John Wagner.
BY
ATTORNEY.

UNITED STATES PATENT OFFICE.

JOHN WAGNER, OF DENVER, COLORADO.

BOLT MAKING AND FORGING MACHINE.

SPECIFICATION forming part of Letters Patent No. 666,167, dated January 15, 1901.

Application filed April 21, 1900. Serial No. 13,804. (No model.)

*To all whom it may concern:*

Be it known that I, JOHN WAGNER, a citizen of the United States of America, residing at Denver, in the county of Arapahoe and State of Colorado, have invented certain new and useful Improvements in Bolt Making and Forging Machines; and I do declare the following to be a full, clear, and exact description of the invention, such as will enable others skilled in the art to which it appertains to make and use the same, reference being had to the accompanying drawings, and to the characters of reference marked thereon, which form a part of this specification.
My invention relates to improvements in bolt making and forging machines; and it consists of the features, arrangements, and combinations hereinafter described and claimed, all of which will be fully understood by reference to the accompanying drawings, in which is illustrated an embodiment thereof.

Figure 1:
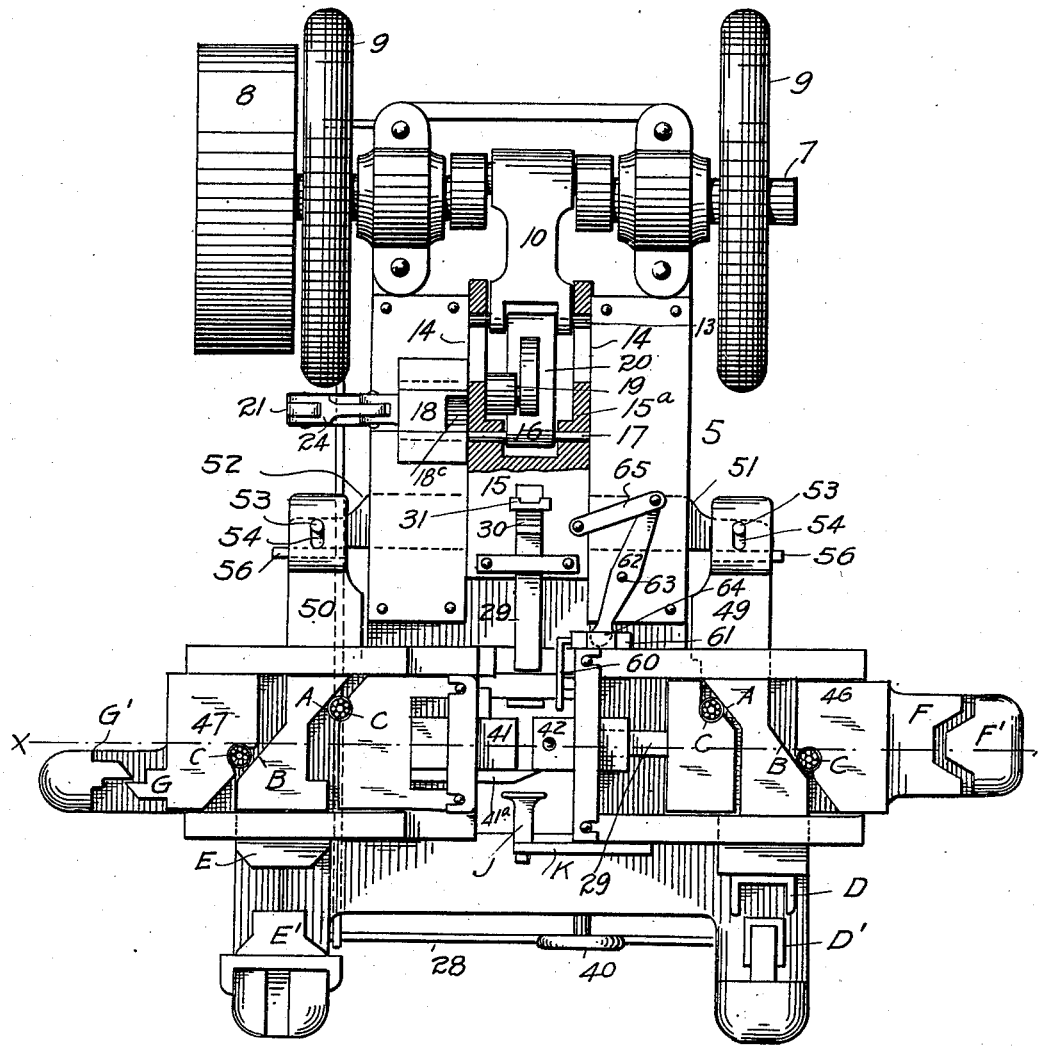
Figure 4:
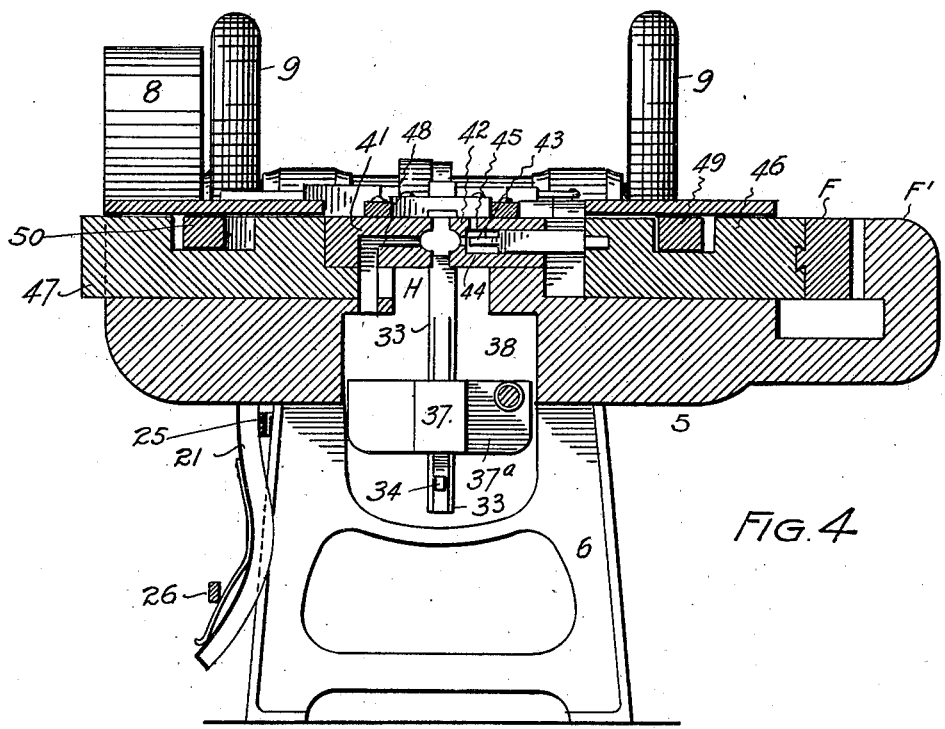
Figure 3:
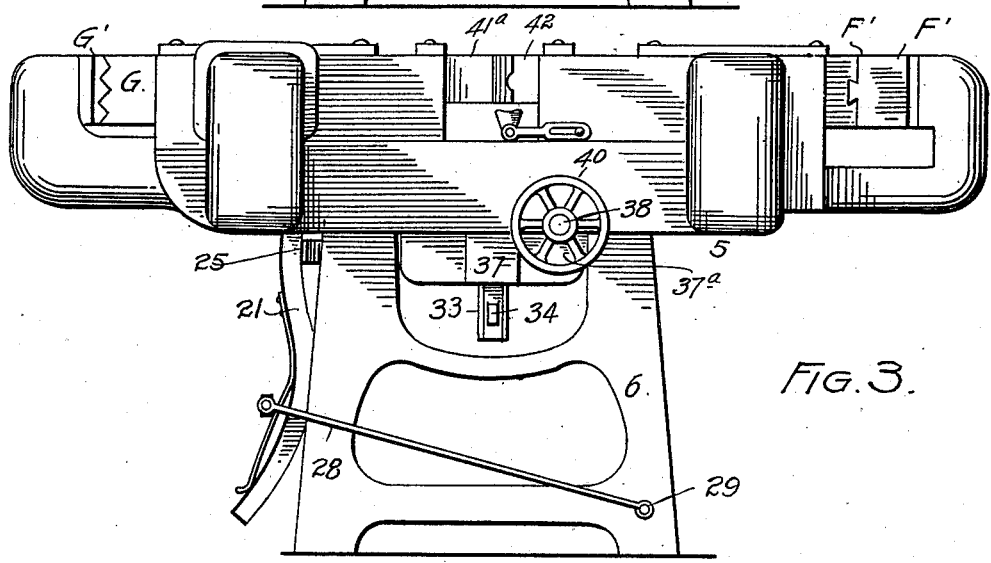

In the drawings, Figure 1 is a top or plan view of my improved machine, partly in section. Fig. 2 is a vertical longitudinal section taken through the center of the same. Fig. 3 is a front end elevation of the machine. Fig. 4 is a section taken on the line X X, Fig. 1. Fig. 5 is a fragmentary section illustrating the mechanism for throwing the machine in and out of gear. Fig. 6 is a perspective view of the laterally-sliding cam-block forming a part of the mechanism shown in Fig. 5. Fig. 7 is a fragmentary longitudinal section taken through one of the reciprocating cam-arms located on opposite sides of the machine and having a movement parallel with that of the central die-block or cross-head. Fig. 8 is a perspective view of the breakable safety device with which each cam-arm is connected.
Fig. 9 is a section taken through the device for throwing out the bolt. Fig. 10 is a perspective view of a portion of the same mechanism. Fig. 11 illustrates the mechanism for adjusting the vertically-movable gage for determining the stock to be used in forming the bolt-head. This is an underneath view. Figs. 12 and 13 are a top view and vertical section, respectively, of the roller-bearings of the die-blocks 46 and 47.
Similar reference characters indicating corresponding parts in these views, let the numeral 5 designate a suitable frame mounted on legs 6. In the rear part of this frame is journaled a crank-shaft 7, provided with a pulley 8 and fly-wheels 9. The crank 12 of this shaft is connected with a pitman 10, whose forward extremity is provided with a pin 13, passing therethrough at right angles to the pitman. The protruding extremities of this pin engage slots 14, formed in the adjacent arms 15$^a$ of the central reciprocating die-block or cross-head 15, whose rear extremity is forked to receive the forward extremity of the pitman. By virtue of these slots 14 the pitman may operate without actuating the die-block. Hinged to the die-block or cross-head 15, forward of the pitman extremity, as shown at 17, is an arm 16, whose rear extremity is adapted to engage the pin 13 in the forward extremity of the pitman. When the arm 16 is in this position, the pin 13 is held at the rear extremities of the slots 14 and the die-block is reciprocated in response to the movement of the crank-shaft and pitman.

The arm 16 may be raised to the dotted-line position in Fig. 2 through the instrumentality of a block 18, adapted to slide laterally or at right angles to the movement of the pitman. This block is provided with a lug 18$^a$, having an inclined face 18$^c$, adapted at its inward limit of movement to occupy a position in the path of a roller 19, mounted on a lug 20, projecting upwardly from the top of the arm 16. As the pitman moves rearwardly the roller travels up the inclined face 18$^c$ and raises the arm sufficiently to disconnect it from the pitman, allowing the latter to move without actuating the die-block. The block 18 is normally held at its inward limit of movement by a lever 21, fulcrumed at 22 on an arm 23, attached to the frame 5 of the machine. The upper arm of this lever is connected with the block by a link 24. The lower arm of the lever is engaged by a spring 25, attached to the frame and which normally holds the lever in the position to throw the inclined face 18$^c$ to the dotted-line position in Fig. 5. The block 18 is provided with tongues or flanges 18$^d$, which engage grooves in the frame of the machine. The lever 21 may be held in a position to maintain the part 18$^c$ out of the path of the roller 19, or in the full-line position in Fig. 5, by a rod 26, having one extremity hinged to the machine, as shown at 27, and whose opposite extremity is connected with the free extremity of an arm 28, hinged on the frame at 29. By pressing down on the arm 28 with the foot the rod 26 will perform the function stated.

To the forward extremity of the die-block 15 is attached the die or tool 29, whose forward extremity is utilized in forming the bolt-head. This tool 29 is inserted in a socket formed in a holder 30, located in a groove formed in the reciprocating block 15. Located immediately in the rear of the holder 30 is a safety device 31, consisting of a plate inserted from the top in grooves or ways formed in the opposite walls of a slot 32, there being a space behind the plate, the latter being sufficiently fragile or weak to break in case the tool 29 engages an unyielding obstruction, as a piece of cold iron. In this event the plate 31 will break and allow the tool 29 and its holder 30 to move rearwardly into the space 32, thus preventing the breaking of the more expensive parts of the machine. These safety-plates 31 may be supplied at a nominal cost.

The gage 33 for determining the amount of stock to be utilized in forming the head of the bolt occupies a vertical position and is slidingly mounted on a lever 34, fulcrumed at 35 and whose rear extremity is connected with the die-block 13 by a link 36. The gage 33, as shown in the drawings, consists of a flat piece of metal and is vertically movable in a guide 37, which is longitudinally adjustable in the frame beneath by means of a screw 38, engaging a stationary nut 39. This screw passes through a plain or unthreaded opening formed in a flange 37$^a$ and is provided with a stop-collar 38$^a$, located on each side of the said flange, whereby as the screw moves back and forth in the nut 39 the guide 37 and the gage 33 are carried with it, being given a corresponding movement. This screw 38 is manipulated by means of a hand-wheel 40, attached to its forward exposed extremity.

Forward of the gage 33 are located the two dies 41 and 42, which are utilized in shaping the shank of the bolt. To the die 41, which is movable, is attached a knife 41$^a$ for cutting off the piece of metal which is to be used in forming the bolt. Through the die 42, which is stationary, passes a punch 43, whose function is the forming of a keyway or slot in the bolt. Within the die 42 and surrounding the reduced working extremity of the punch is a water-chamber 44, having an inlet-opening 45 at the top. This punch is connected with a die-block 46, located at the forward extremity of the frame and reciprocating in a horizontal plane at right angles to the direction of the die-block 15.

The die 41 is mounted on a die-block 47 and is provided with a passage 48, located directly opposite the punch 43 for the escape of the metal punched out of the keyway. The die-blocks 46 and 47 are actuated by reciprocating cam-arms 49 and 50, respectively. These arms are connected with the outer extremities of extensions 51 and 52, made fast to the die-block 15 and passing through openings formed in the frame on opposite sides of the way in which the block 15 reciprocates. These arms are connected with said extensions by pins 53, which are made fast in the extensions and pass through vertical slots 54, formed in the cam-arm extremities, which are forked to receive the said extensions. In front of each extension 50 51 is formed a space or cavity 55 in the cam-arm, and in front of each extension is placed a safety device 56, forming a stop against which the extension bears and of sufficient strength to resist the force applied to it during the performance of the ordinary functions of the machine. If, however, the cam-arm should meet with undue or extraordinary resistance, the safety plate or key 56 will break and allow the extension-arm 50 or 51, as the case may be, to move forwardly without moving the cam-arm, thus preventing the breaking of the machine. In order to resume work, it will only be necessary to substitute another safety key-plate for the broken one. These cam-arms 49 and 50 are each provided with inclined cam-faces A and B, adapted to engage two roller-bearings C, mounted on each die-block 46 47. The arrangement of the parts is such (see Fig. 1) that as the cam-arms move forwardly the die-blocks are moved inwardly and as the cam-arms move rearwardly the die-blocks are moved outwardly. The outer extremities of the cam-arms 49 and 50 and of the die-blocks 46 and 47 are provided with dies D E F G, respectively, coöperating with stationary die parts D', E', F', and G'. These dies are intended for various kinds of forging and may be changed at will, according to the work to be done or as convenience or necessity may require.

The bolt after being formed by the dies is detached and allowed to fall downward through an opening H in the frame of the machine by an arm 60, attached to a block 61, arranged to slide laterally in the frame in response to the movement of a lever 62, fulcrumed at 63. One extremity of this lever projects into a housing 64, attached to the top of the block 61, while the other extremity of the lever is connected with one extremity of a link 65, whose opposite extremity is connected with the die-block 15. As shown in the drawings, the block 61 is provided with grooves 61$^a$, formed in two opposite sides and adapted to engage a top plate 66 of the framework of the machine. It is evident that as the die-block 15 moves rearwardly the block 61 and its arm 60 will be shifted inwardly, as required, in order to perform the function stated.

In the operation of the machine the pulley 8 is connected by means of a belt with any suitable motor or power for actuating the crank-shaft 7. As this shaft is operated a reciprocating movement is imparted to the die-block 15 through the instrumentality of the pitman 10. As the die-block 15 reciprocates a corresponding parallel movement is simultaneously imparted to the cam-arms 49 and 50, which in turn impart a reciprocating movement to the die-blocks 46 and 47 at right angles to the movement of the cam-arms by virtue of the construction and arrangement of parts heretofore described. Furthermore, as the die-block 15 reciprocates the lever 34 is actuated to impart a vertically-reciprocating movement to the gage 33. As the die 15 moves forward the rear arm of the lever will be raised and its opposite arm depressed, moving the gage downward. While the die-block moves backward the gage will be raised to bring its upper extremity into the path of the piece of iron from which the bolt is to be formed. In using the machine, which, it will be assumed, is operating as just described, the red-hot iron is inserted between the dies 41 and 42 and moved rearwardly until it strikes the gage 33, when the die-block 15 is at or approximately at its rearward limit of movement, the die 41 being moved outward away from the stationary die 42 and the keyway-punch being moved in the opposite direction to permit the insertion of the iron. As soon as this is done the tool 29 moves forward and engages the end of the iron, forming the bolt-head, the die 41 simultaneously engaging the iron forward of the head and forcing it against the die 42, whereby the shank of the bolt is properly shaped. At the same time the keyway-punch 43 moves toward the left (referring to Fig. 4) and punches the keyway slot or opening in the bolt. During this operation water is running downward through the opening 45 into the chamber 44, keeping said chamber full of water, whereby the punch, which is surrounded by water, is kept cool during the operation of the machine. This water runs out of the punch-opening in the die 42 as the punch moves toward the right, and is therefore continually changing. After the bolt has been formed the die-block 15 and the die 29 move rearwardly and the die 41 and the punch 43 outwardly away from the bolt, which is then acted on by the arm 60, which moves inwardly and insures the removal of the bolt in time for the insertion of the iron for making another bolt, and so on, the operation being continually repeated.

The roller-bearings C of the die-blocks 46 and 47 are each composed of a central spindle C', attached to the block and surrounded by a number of rollers $C^2$, the whole being inclosed by a revoluble sleeve $C^3$.

Having thus described my invention, what I claim is—

1. In a bolt-heading machine, the combination with an operating-shaft, of a reciprocating die-block connected with the shaft and operated thereby, a bolt-heading tool carried by the block, an operating-pitman, a movable auxiliary arm interposed between the pitman and the die-block, the latter being slotted to receive a pin in the pitman, permitting the latter to reciprocate without moving the die-block when the said arm is disconnected from the pitman, and suitable means for disconnecting the arm from the pitman, comprising a slidable block arranged to be moved into the path of a bearing on the said arm, the block being provided with an inclined face whereby the arm is raised for the purpose set forth.

2. The combination with an operating-shaft and pitman, of a die-block connected with the pitman to allow the latter to reciprocate without moving the block, a hinged stop-arm movable on the die-block and adapted to engage the forward extremity of the pitman causing the latter to operate the block, a sliding block for disconnecting the stop-arm from the pitman, and a lever for actuating the block.

3. In a bolt-making or kindred machine, the combination of a vertically-movable gage adapted to be projected into the path of the bolt-rod, a horizontally-movable holder in which the gage is slidingly mounted, and means connected with the holder for adjusting the position of the gage according as more or less stock is required for forming the bolt-head, said means comprising a screw threaded in a stationary part of the machine and connected with the gage-holder whereby the latter travels with the screw.

4. The combination of a central reciprocating die-block, a tool connected with said block for forming the bolt-head, two extensions connected with the central die-block and extending therefrom in opposite directions, at right angles to the die-block, arms connected with said extensions by pins fast in the extensions and passing through slots in the arms, a space being left in the arms forward of each extension, a breakable device inserted in each arm immediately forward of the extensions, the said arms being provided with cam-faces, and die-blocks operated by said cam-arms.

5. The combination with a longitudinally-reciprocating die-block or cross-head, of a sliding block connected with said die-block and provided with a device for removing the bolt from its position as the die-block moves rearwardly, and a suitable connection between the die-block and the sliding block, comprising a lever fulcrumed on a stationary part, one extremity being connected with the sliding block, and a link connecting the opposite extremity with the die-block.

In testimony whereof I affix my signature in presence of two witnesses.

JOHN WAGNER.

Witnesses:
 HAL D. VAN GILDER,
 A. J. O'BRIEN.